United States Patent [19]
Yonekawa

[11] Patent Number: 5,104,143
[45] Date of Patent: Apr. 14, 1992

[54] VEHICLE SUSPENSION SYSTEM WITH ROLL CONTROL VARIABLE ACCORDING TO VEHICLE SPEED

[75] Inventor: Takashi Yonekawa, Mishima, Japan

[73] Assignee: Toyota Jidosha Kabushiki Kaisha, Japan

[21] Appl. No.: 586,202

[22] Filed: Sep. 21, 1990

[30] Foreign Application Priority Data

Sep. 27, 1989 [JP] Japan ............................ 1-251076
Mar. 14, 1990 [JP] Japan ............................ 2-63322

[51] Int. Cl.⁵ .................................................. B60G 11/26
[52] U.S. Cl. ........................................ 280/707; 280/709; 280/772; 304/424.05
[58] Field of Search ............... 280/707, 91, 709, 840, 280/772; 364/424.05

[56] References Cited

U.S. PATENT DOCUMENTS

| | | | |
|---|---|---|---|
| 4,717,173 | 1/1988 | Sugasawa et al. | 280/707 |
| 4,789,935 | 12/1988 | Buma et al. | 280/707 X |
| 4,821,191 | 4/1989 | Ikemoto et al. | 280/707 X |
| 4,853,860 | 8/1989 | Achenbach | 280/707 X |
| 4,937,748 | 6/1990 | Yonekawa et al. | 364/424.05 |
| 4,979,115 | 12/1990 | Takahashi | 280/91 X |
| 4,999,777 | 3/1991 | Schussler | 364/424.05 |

FOREIGN PATENT DOCUMENTS

| | | | |
|---|---|---|---|
| 0198509 | 9/1987 | Japan | 280/707 |
| 62-198511 | 9/1987 | Japan . | |
| 63-17185 | 1/1988 | Japan . | |
| 0106127 | 5/1988 | Japan | 280/707 |
| 0197109 | 8/1989 | Japan | 280/707 |
| 0038122 | 2/1990 | Japan | 280/707 |
| 2-155814 | 6/1990 | Japan . | |
| 2-155819 | 6/1990 | Japan . | |

Primary Examiner—Charles A. Marmor
Assistant Examiner—Tamara L. Finley
Attorney, Agent, or Firm—Oliff & Berridge

[57] ABSTRACT

In a vehicle suspension system, the fluid pressure type actuators provided between a vehicle body and wheels are so controlled that a ratio of the load to be born by the front wheels to the load to be born by the rear wheels determined based upon the rate of change of lateral acceleration is modified to be increased along with increase of vehicle speed, and in case of the four wheel steering, the roll stiffness in the rear wheels is decreased along with increase of vehicle speed, both for the purpose of improving the stability in steering at high vehicle speed while ensuring the high steerability at low vehicle speed. The roll stiffness in the rear wheels may also be modified to be higher in a transitional state than in a constant state in a turning.

5 Claims, 12 Drawing Sheets

STEP 430: CALCULATIONS OF TARGET ELECTRIC CURRENTS
$I_1 = K_{u1}P_{u1} + K_h(P_{sr} - P_s) - K_l \cdot P_d - a$
$I_2 = K_{u2}P_{u2} + K_h(P_{sr} - P_s) - K_l \cdot P_d - a$
$I_3 = K_{u3}P_{u3} + K_h(P_{sr} - P_s) - K_l \cdot P_d$
$I_4 = K_{u4}P_{u4} + K_h(P_{sr} - P_s) - K_l \cdot P_d$ STEP 440: CALCULATIONS FOR TEMPERATURE COMPENSATION
$I_{ti} = K_t \cdot I_i$ (i = 1, 2, 3 & 4) (FIG. 14)

STEP 450: CALCULATION OF ELECTRIC CURRENT FOR WARPING
$I_w = (I_{t1} - I_{t2}) - (I_{t3} - I_{t4})$

STEP 460: CALCULATIONS OF DIFFERENCE OF ELECTRIC CURRENT FOR WARPING
$E_{iw} = R_{iw} - I_w$

STEP 470: CALCULATIONS OF TARGET CONTROL QUANTITY FOR ELECTRIC CURRENT FOR WARPING
$E_{iwp} = K_{iwp} \cdot E_{iw}$ STEP 480: CALCULATIONS FOR REVERSAL CONVERSION OF ELECTRIC CURRENT FOR WARPING
$I_{w1} = E_{iwp}/4$
$I_{w2} = -E_{iwp}/4$
$I_{w3} = -E_{iwp}/4$
$I_{w4} = E_{iwp}/4$ STEP 490: CALCULATIONS OF FINAL TARGET ELECTRIC CURRENTS
$I_{tti} = I_{ti} + I_{wi}$ (i = 1, 2, 3 & 4)

VEHICLE SUSPENSION SYSTEM WITH ROLL CONTROL VARIABLE ACCORDING TO VEHICLE SPEED

BACKGROUND OF THE INVENTION

1. Field of the Invention

The present invention relates to a vehicle suspension system, and more particularly, to a vehicle suspension system for a vehicle such as an automobile which is improved with respect to the roll control in the turning of the vehicle over a wide speed range from low vehicle speed to high vehicle speed.

2. Description of the Prior Art

In a vehicle such as an automobile it is generally desirable that the US-OS performance is set on the oversteer (OS) side from the view point of improving the responsiveness to steering in the turning of the vehicle, while it is desirable that the US-OS performance is set on the understeer (US) side from the view point of improving the stability of steering in the turning of the vehicle. In view of this, in, for example, Japanese Patent Laid-open Publication 62-198511 it is described to operate the suspension control means with the US-OS performance being set on the oversteer side of neutral in the beginning of a turning of the vehicle and on the understeer side near the end of the turning of the vehicle.

According to such a suspension control means a quick steering is available in the beginning of a turning of the vehicle due to an oversteer or neutral performance of the suspension control, and a stable steering operation is available near the end of the turning of the vehicle due to an understeer performance of the suspension control.

However, since in such a suspension control means the US-OS performance is set on the oversteer side or neutral in the beginning of a turning regardless of the vehicle speed, the stability of steering lowers when the vehicle turns at high vehicle speed.

Further, it is already known as described in, for example, Japanese Patent Laid-open Publication 63-17185 to construct a four wheel steering means to be responsive to vehicle speed so that the front and rear wheels are steered with a variable front to rear wheel steering angle ratio which is varied from a substantial value in the opposite phase to a substantial value in the same phase along with increase of vehicle speed so that both a small radius turning a low vehicle speed and a high steering stability at medium to high vehicle speed are available. Such a four wheel steering means can provide a very good turning performance as compared with a steering control means in which front wheels only are steered.

However, since such a four wheel steering means increases the steering angle in the rear wheels in the direction of the same phase along with increase of vehicle speed, a rolling of the vehicle body is apt to occur in an early stage of turning. Further, since in such a four wheel control means the front to rear wheel steering angle ratio is set to a high value in the same phase at high vehicle speed so that the US-OS performance is in an understeer performance, the responsive to the steering in a transitional state in a turning at high vehicle speed is low.

In view of the above-mentioned problem it is a first object of the present invention to provide a vehicle suspension system which is improved in ensuring the stability of steering in the turning at high vehicle speed without sacrificing the quick steering performance in the turning at low vehicle speed.

Further, in view of the above-mentioned problem in a vehicle having such a conventional four wheel steering means, it is a second object of the present invention to provide a vehicle suspension system which is improved in the steering performance in a transitional state in a turning, particularly, the steering performance in a transitional state in a high speed turning while ensuring the stability of steering in high speed running.

SUMMARY OF THE INVENTION

According to the present invention, the above-mentioned first object is accomplished by a vehicle suspension system for a vehicle such as an automobile, comprising a plurality of fluid pressure type actuators provided between a vehicle body and each wheel, a working fluid supply and exhaust means for supplying and exhausting working fluid to and from said actuators, a means for detecting or forecasting a rate of change of lateral acceleration of the vehicle body, a control means for controlling said working fluid supply and exhaust means according to a control amount depending upon said rate of change of lateral acceleration of the vehicle body so as to adjust a supporting load at each wheel and thereby to suppress rolling of the vehicle body, wherein said control means increases a ratio of such adjustment for a front wheel to that for a rear wheel along with increase of vehicle speed.

According to the above-mentioned construction, the supporting load at each wheel is adjusted by the control operation of said working fluid supply and exhaust means according to a control amount depending upon the rate of change of lateral acceleration of the vehicle body so that the rolling of the vehicle body is suppressed, wherein the ratio of such adjustment for the front wheel to that for the rear wheel is increased along with increase of the vehicle speed, or in other words, such a ratio is decreased to be lower when the vehicle speed is lower.

Therefore, the US-OS performance is shifted to the understeer side along with increase of the vehicle speed without changing the US-OS performance at low speed operation of the vehicle. Thus, the stability of steering at high speed turning is ensured without sacrificing the quick steering performance at low speed turning.

Further, according to the present invention, the above-mentioned second object is accomplished by a vehicle suspension system for a vehicle such as an automobile having a four wheel steering means adapted to change a front to rear wheel steering angle ratio from an opposite phase to a same phase along with increase of vehicle speed, comprising a plurality of fluid pressure type actuators provided between a vehicle body and each wheel, a working fluid supply and exhaust means for supplying and exhausting working fluid to and from said actuators, a front wheel roll stiffness control means and a rear wheel roll stiffness control means adapted to control roll stiffness in front wheels and rear wheels, respectively, a means for obtaining said front to rear wheel steering angle ratio, a means for detecting a transitional state in a turning, and a means for controlling said front and rear roll stiffness control means, wherein said roll control means is adapted to decrease the roll stiffness in the rear wheels along with increase of the front to rear wheel steering angle ratio in a direction of the same phase, and to increase the roll stiffness in the rear wheels in the transitional state in the turning as compared in a constant state in the turning.

According to the above-mentioned construction, the roll stiffness in the rear wheels is decreased along with increase of the front to rear wheel steering angle ratio in the direction of the same phase, while the roll stiffness in the rear wheels is set to be higher in a transitional state in a turning than in a constant state in the turning.

Therefore, it is possible to set the US-OS performance in an understeer condition at high vehicle speed without increasing the steering angle in the rear wheels. Therefore, it is avoided that the roll of the vehicle body occurs too early in a turning, and the controllability on the roll of the vehicle body is improved. Further, since the degree of understeer characteristic in the US-OS performance is decreased in a transitional state in a turning at high vehicle speed as compared in a constant state in the turning, the responsiveness to steering in the transitional state in the turning at high vehicle speed is improved. Further, since the US-OS performance in the constant state in a turning at high vehicle speed is maintained at a determinate understeer condition, the stability in steering in the constant state in a turning at high vehicle speed is not damaged.

The present invention may employ any roll stiffness control means which can vary the roll stiffness in the front wheels and the rear wheels independently from one another. For example, a fluid pressure type active suspension adapted to be able to control the load supported by each wheel or an active stabilizer adapted to be able to variably control the roll stiffness is employable.

BRIEF DESCRIPTION OF THE DRAWINGS

In the accompanying drawings,

FIGS. 6A through 6C are flowcharts showing the subroutine calculations for the active control carried out in step 110 in the flowchart shown in FIG. 3;

DESCRIPTIONS OF THE PREFERRED EMBODIMENTS

In the following the present invention will be described in detail with respect to some preferred embodiments thereof with reference to the accompanying drawings.

Figure 1:
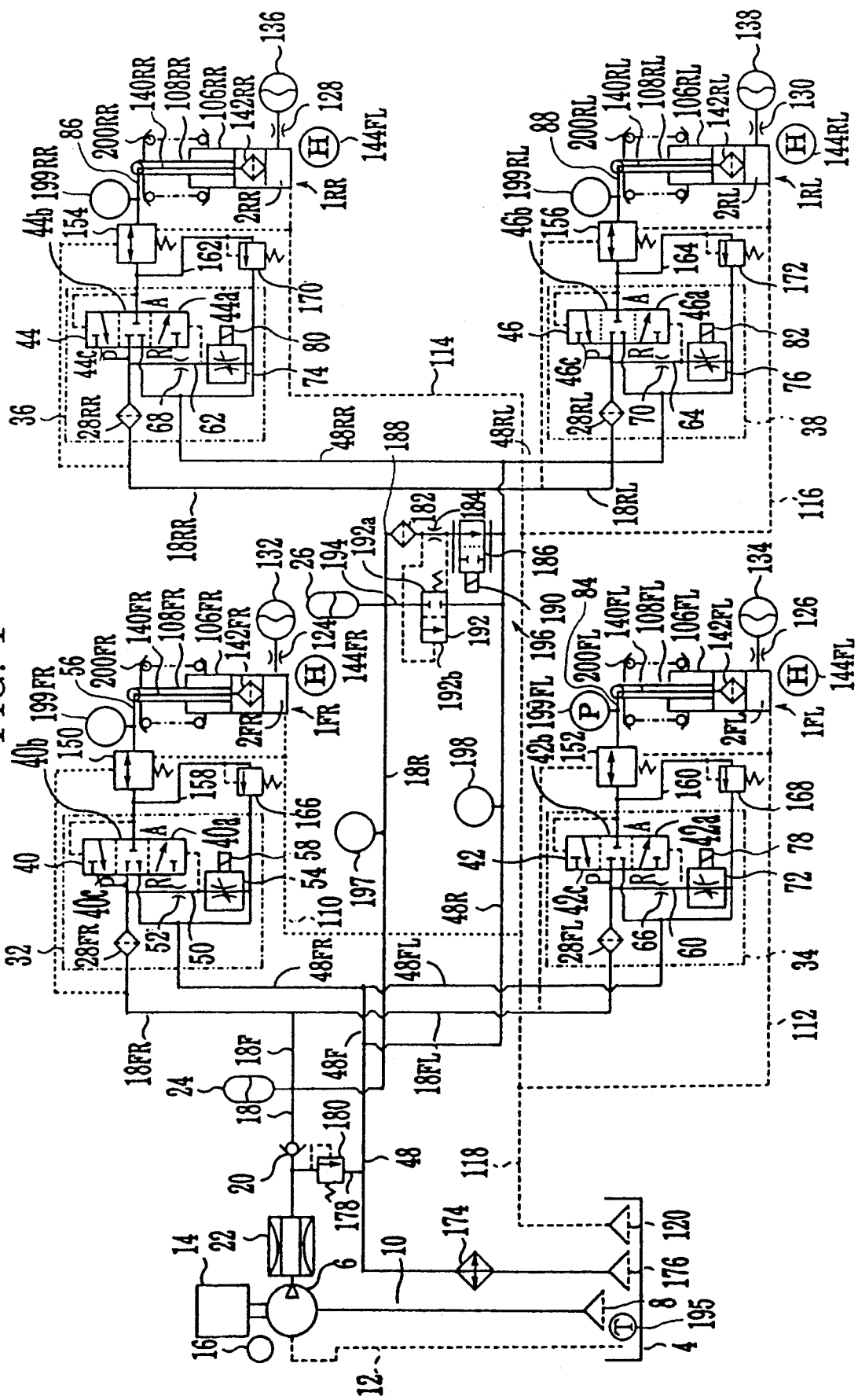
FIG. 1 is a diagrammatic illustration of the fluid pressure circuits of a fluid pressure type active suspension system embodying the vehicle suspension system according to the present invention.

FIG. 1 is a diagrammatic view showing the fluid circuits of a fluid pressure type active suspension system in which the vehicle suspension system according to the present invention is embodied. The suspension system shown in this figure includes actuators 1FR, 1FL, 1RR and 1RL provided for front right, front left, rear right and rear left vehicle wheels, not shown, respectively. These actuators have therein working fluid chambers 2FR, 2FL, 2RR, and 2RL, respectively.

In the figure, 4 designates a reserve tank which contains oil serving as the working fluid, and the tank 4 is connected to the suction side of a pump 6 by a suction line 10 having therein a filter 8 for removing foreign materials from the oil. To the pump 6 is connected with a drain line 12 which collects the oil leaked in the pump and returns it to the reserve tank 4. The pump 6 is drivingly connected with and rotationally driven by an engine 14, the rotational speed of which is detected by a rotational speed sensor 16.

A high pressure line 18 is connected with the discharge side of the pump 6. A check valve 20 is incorporated in the high pressure line 18 so as to permit only the flow of oil in the direction from the pump toward the actuators, and between the pump 6 and the check valve 20 is provided an attenuator 22 which serves to absorb or dampen the pressure pulsation of the oil discharged from the pump, thereby reducing the pressure variation. The high pressure line 18 is connected with one end each of a high pressure line 18F for the front vehicle wheels and a high pressure line 18R for the rear vehicle wheels, with which are connected accumulators 24 and 26, respectively. These accumulators contain therein pressurized gas and serve to absorb pressure variation of the oil and to accumulate pressure. A high pressure line 18FR for the front right vehicle wheel and a high pressure line 18FL for the front left vehicle wheel are each connected at one end thereof with the high pressure line 18F, while a high pressure line 18RR for the rear right vehicle wheel and a high pressure line 18RL for the rear left vehicle wheel are each connected at one end thereof with the high pressure line 18R. The high pressure lines 18FR, 18FL, 18RR and 18RL have therein filters 28FR, 28FL, 28RR and 28RL, respectively, and are connected at their other ends with ports P of pilot-operated three-port switching control valves 40, 42, 44 and 46 included in pressure control means 32, 34, 36 and 38, respectively.

The pressure control means 32 comprises the switching control valve 40, a line 50 for connecting the high pressure line 18FR with a low pressure line 48FR for the front right vehicle wheel a fixed throttle means 52 and a variable throttle means 54 both provided in the line 50. The switching control valve 40 has, an addition to the port P, ports R and A connected with a low pressure line 48FR and a connection line 56, respectively. The switching control valve 40 may be a spool type valve adapted to be switched over by a pilot pressure Pp taken from the line 50 at a portion between the throttle means 52 and 54 and a pressure Pa taken from the connection line 56 to a switching position 40a where it communicates the port P with the port A when the pressure Pp is substantially higher than the pressure Pa; a switching position 40b where it interrupts communication among all the ports when the pressure Pp is substantially equal to Pa; and a shifting position 40c where it communicates the port R with the port A when the pressure Pp is substantially lower than the pressure Pa. The variable throttle means 54 is adapted to vary its effective flow area by the electric current supplied to its solenoid 58 being controlled and to cooperate with the fixed throttle means 52 to variably control the pilot pressure Pp.

Similarly, the pressure control means 34, 36 and 38 comprise pilot-operated, three-port switching control valves 42, 44 and 46 corresponding to the valve 40, lines 60, 62 and 64 corresponding to the line 50, fixed throttle means 66, 68 and 70 corresponding to the throttle means 52, and variable throttle means 72, 74 and 76 corresponding to the variable throttle means 54, respectively. The variable throttle means 72, 74 and 76 have solenoids 78, 80 and 82, respectively, corresponding to the solenoid 58.

The switching control valves 42, 44 and 46 have the same construction as the switching valve 40, and have the ports R connected with one end of a low pressure line 48FL for the front left vehicle wheel, a low pressure line 48RR for the rear right vehicle wheel, and a low pressure line 48RL for the rear left vehicle wheel, respectively, and the ports A connected with one end of connection lines 84, 86 and 88, respectively. The switching control valves 42, 44 and 46 are spool type valves adapted to take in as pilot pressures therefor the pressures Pp in the associated lines 60, 62 and 64 between the associated fixed and the variable throttling means and the pressures Pa in the associated lines 84, 86 and 88, and to be shifted to switching positions 42a, 44a and 46a, respectively, where they communicate the ports P with the ports A when the pressures Pp are substantially high than the pressures Pa; shifting positions 42b, 44b and 46b where they interrupt communications among all the ports when the pressures Pp are substantially equal to the pressures Pa; and shifting positions 42c, 44c and 46c where they communicate the ports R with the ports A when the pressures Pp are substantially lower than the pressures Pa.

As shown schematically in FIG. 1, the actuators 1FR, 1FL, 1RR and 1RL include cylinders 106FR, 106FL, 106RR and 106RL and pistons 108FR, 108FL, 108RR and 108RL reciprocably inserted into the associated cylinders, defining working fluid chambers 2FR, 2FL, 2RR and 2RL, respectively. While in the shown embodiment the actuators are located between a vehicle body, not shown, and associated suspension arms, also not shown, with each cylinder being coupled to the associated suspension arm and the upper end of the rod portion of each piston being coupled to the vehicle body, each cylinder may be coupled to the vehicle body while each piston may be coupled the associated suspension arm. Drain lines 110, 112, 114 and 116 are connected at each one end with the cylinders 106FR, 106FL, 106RR and 106RL of the actuators, respectively. The other ends of the drain lines 110, 112, 114 and 116 are connected with a drain line 118 which in turn is connected with the reserve tank 4 by way of a filter 120 so that the oil leaked from the working fluid chambers may be returned to the tank.

Accumulators 132, 134, 136 and 138 are connected to the working fluid chambers 2FR, 2FL, 2RR and 2RL by way of throttle means 124, 126, 128 and 130, respectively, serving as hydropneumatic springs. The pistons 108FR, 108FL, 108RR and 108RL have therein passages 140FR, 140FL, 140RR and 140RL, respectively. The passages connect the associated lines 56, 834, 86 and 88 with the associated working fluid chambers 2FR, 2FL, 2RR and 2RL, respectively, and have therein filters 142FR, 142FL, 142RR and 142RL, respectively. Adjacent the actuators 1FR, 1FL, 1RR and 1RL are installed vehicle height sensors 144FR, 144FL, 144RR and 144RL, respectively, for detecting vehicle heights corresponding to the associated vehicle wheels.

The lines 56, 84, 86 and 88 have therein pilot-operated cut-off valves 150, 152, 154 and 156, respectively, which are in closed conditions whenever the pressure differences between the pressures in the high pressure lines 18FR, 18FL, 18RR and 18RL upstream of the associated pressure control valves 40, 42, 44 and 46, respectively, and the pressures in the drain lines 110, 112, 114 and 116, respectively, are not more than respective predetermined values. The lines 56, 84, 86 and 88 are, at portions thereof between the associated pressure control valves and the cut-off valves, connected with the line 50, 60, 62 and 64 on the downstream side of the associated variable throttle means by lines 158, 160, 162 and 164, respectively, which have therein relief valves 166, 168, 170 and 172, respectively, adapted to take in as pilot pressures therefor the pressures in the associated lines 158, 160, 162 and 164, respectively, on the upstream side thereof, and to open when the pilot pressures exceed respective predetermined values so as thereby to conduct certain amount of oil in the connection lines to the lines 50, 60, 62 and 64, respectively.

The cut-off valves 150, 152, 154 and 156 may be adapted to remain closed whenever the difference between the pressures in the high pressure lines 18FR, 18FL, 18RR and 18RL and the atmospheric pressure are not more than respective predetermined values.

The lines 48FR and 48FL are connected at their other ends with one end of a low pressure line 48F for the front vehicle wheels, while the lines 48RR and 48RL are connected at their other ends with one end of a low pressure line 48R for the rear vehicle wheels. The lines 48F and 48R are connected at their other ends with one end of a low pressure line 48. The line 48 has therein an oil cooler 174 and is connected at the other end with the reserve tank 4 by way of a filter 176. The high pressure line 18 is, at a portion thereof between the check valve 20 and the attenuator 22, with the low pressure line 48 by a line 178. The line 178 has therein a relief valve 180 adapted to open when its pilot pressure is higher than a predetermined value.

The high pressure line 18R and the low pressure line 48R are connected with each other by a line 188 which has therein a filter 182, a throttle means 184 and a normally open type electromagnetic on-off valve 186 including a solenoid 190 for controlling the valve opening. The on-off valve 186 is adapted to open when its solenoid 190 is energized and to control the flow rate of the oil flowing therethrough according to control of the energizing electric current supplied thereto. The high pressure line 18R and the low pressure line 48R are further connected with each other by a line 194 having therein a pilot-operated on-off valve 192. The on-off valve 192 is adapted to take in as a pilot pressure therefor the pressures on opposite sides of the throttle means 184 and to remain in its closed position 192a when no substantial pressure difference exists between the pressures on opposite sides of the throttle means 184 and to be switched over to its open position 192b when the pressure difference across the throttle means 184 is higher than a predetermined value. Thus, the throttle means 184, the electromagnetic on-off valve 186 and the on-off valve 192 cooperate with each other to define a bypass means 196 which selectively communicates the high pressure line 18R with the pressure flow line 48R while controlling the flow rate of the oil flowing from the high pressure line to the low pressure line.

Further in the shown embodiment, a pressure sensor 197 is connected to the high pressure line 18R for detecting the oil pressure Ps therein and similarly a pressure sensor 198 is connected to the low pressure line 48R for detecting the oil pressure Pd therein. Pressure sensors 199FR, 199RL, 199RR and 199RL are connected to the connection lines 56, 84, 86 and 88 for detecting the oil pressure in he working fluid chambers 2FR, 2RL, 2RR and 2RL, respectively. A temperature sensor 195 is provided in the reserve tank 4 for detecting the temperature T of the oil in the tank. Compression coil springs 200FR, 200FL, 200RR and 200RL serving as suspension springs are interposed between the upper seats attached to the rod portions of the pistons 108FR, 108FL, 108RR and 108RL incorporated in the actuators and the lower seats secured to the cylinders 106FR, 106FL, 106RR and 106RL, respectively.

Figure 17:
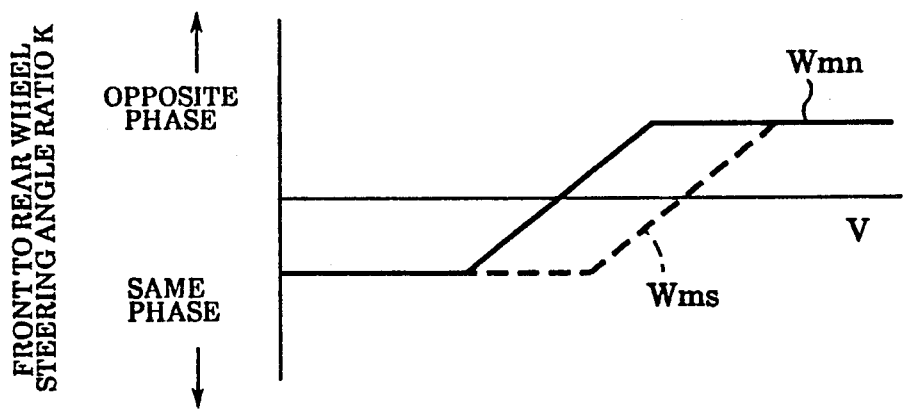
FIG. 17 is a graph showing the relation between the front to rear wheel steering ratio K and vehicle speed.

In a vehicle in which the shown embodiment is incorporated, the steering angles at the front wheel and the rear wheel change as shown in FIG. 17 according to the vehicle speed. This performance can be changed over between a normal mode Wmn according to which the steering angle ratio changes from the opposite phase to the common phase at a relatively low vehicle speed and a sports mode Wms according to which the steering angle ratio is changed over from the opposite phase to the common phase at a relatively high vehicle speed.

Figure 2:
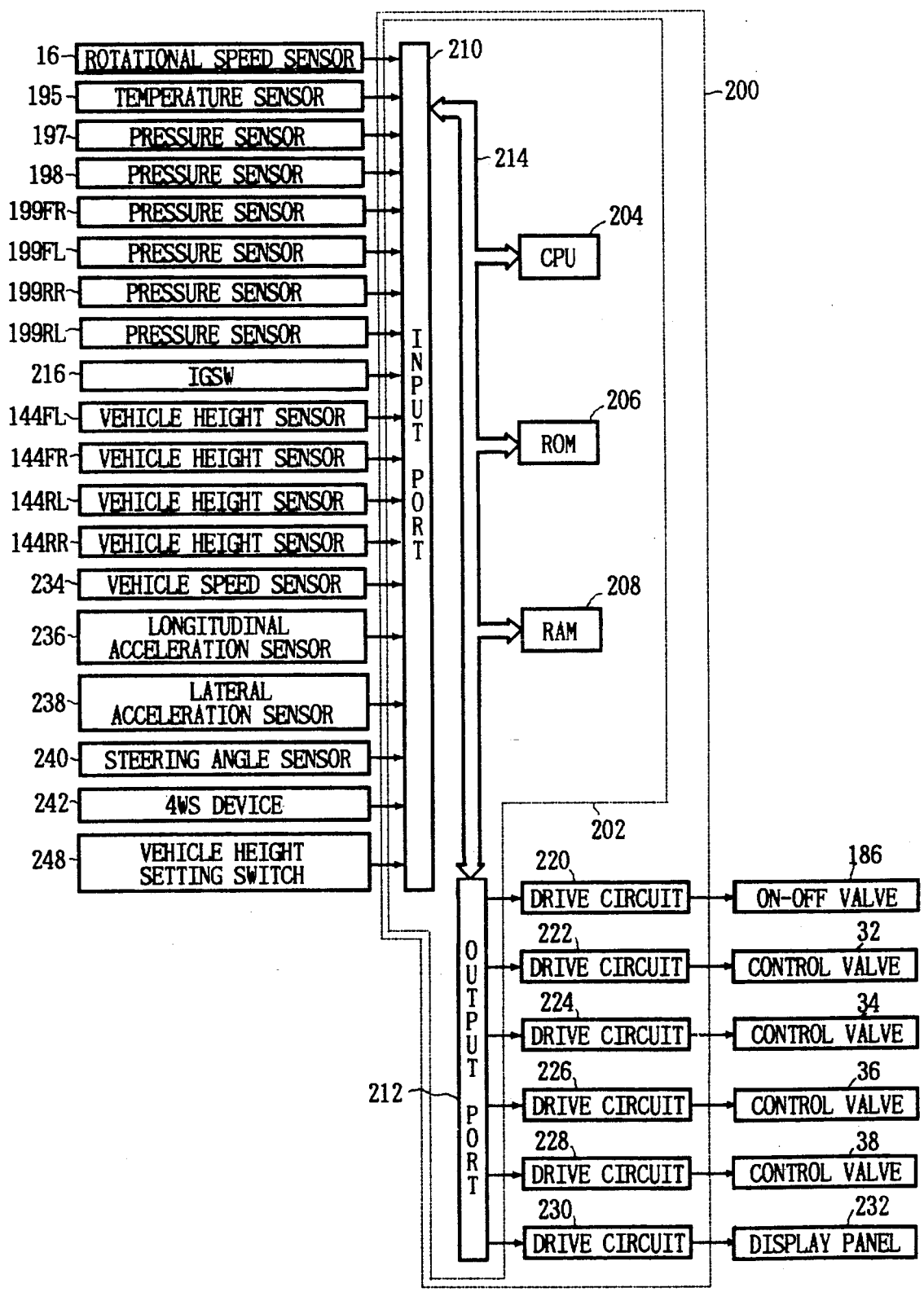
FIG. 2 is a block diagram showing an electric control device in the embodiment shown in FIG. 1.

The electromagnetic on-off valve 186 and the pressure control means 32, 34, 36 and 38 are controlled by an electric control device 200 shown in FIG. 2. The electric control device 200 includes a microcomputer 202. The microcomputer 202 may, as shown in FIG. 2, be of a conventional construction having a central processing unit (CPU) 204, a read only memory (ROM) 206, a random access memory (RAM) 208, an input port device 210, and an output port device 212, all of these interconnected with each other by a two way common bus 214.

The input port device 210 is supplied with a signal indicative of the rotational speed N of the engine 14 from the rotational speed sensor 16, a signal indicative of the temperature T of the oil from the temperature sensor 195, signals indicative of the pressures PS and Pd within the high pressure and the low pressure lines form the pressure sensors 197 and 198, respectively, signals indicative of the pressures Pi (here "i" is "1" for the front left wheel, "2" for the front right wheel, "3" for the rear left wheel, and "4" for the rear right wheel) in the working fluid chambers 2FL, 2FR, 2RL and 2RR from the pressure sensors 199FL, 199FR, 199RL and 199RR, respectively, a signal indicative of whether or not an ignition switch (IGSW) 216 is on from the ignition switch, and signals indicative of the vehicle heights Xi (i=1, 2, 3 and 4) corresponding to the front left wheel, the front right wheel, the rear left wheel, and the rear right wheel from the vehicle height sensors 144FL, 144FR, 144RL and 144RR, respectively.

Further, the input port device 210 is supplied with a signal indicative of a vehicle speed V from a vehicle speed sensor 234, a signal indicative of a longitudinal acceleration Ga from a longitudinal acceleration sensor 236, a signal indicative of a lateral acceleration Gl from a lateral acceleration sensor 238, a signal indicative of a steering angle As from the steering angle sensor 240, a signal indicative of a front to rear steering angle ratio K set up by a control means in the four wheel steering means 242 for the four wheel steering, and a signal indicative of whether the mode Hset for controlling the vehicle height set by a vehicle height setting switch 248 is a high mode Hh or a normal mode Hn. The switch 248 is provided in the cabin to be operated by a diver or a passenger according to his taste.

The input port device 210 processes the signals input thereto in a predetermined manner, and under the control of the CPU 204 which is based upon the program stored in the ROM 206, outputs the processed signals to the CPU and the RAM 208. The ROM 206 stores the control flows shown in FIG. 3 and FIGS. 6A through 6C and the maps shown in FIGS. 4 and 5 and FIGS. 7 through 17. The output port device 212 outputs, under the control of the CPU 204, a control signal via drive circuit 220 to the electromagnetic on-off valve 186, the control signals via drive circuits 222, 224, 226 and 228 to the pressure control means 32, 34, 36 and 38, or more exactly, to the solenoids 58, 78, 80 and 82 in the variable throttle means 54, 72, 74 and 76, respectively, and a control signal via a drive circuit 230 to a display panel 232.

Referring now to the flowchart shown in FIG. 3, the operation of the embodiment will be explained.

Figure 3:
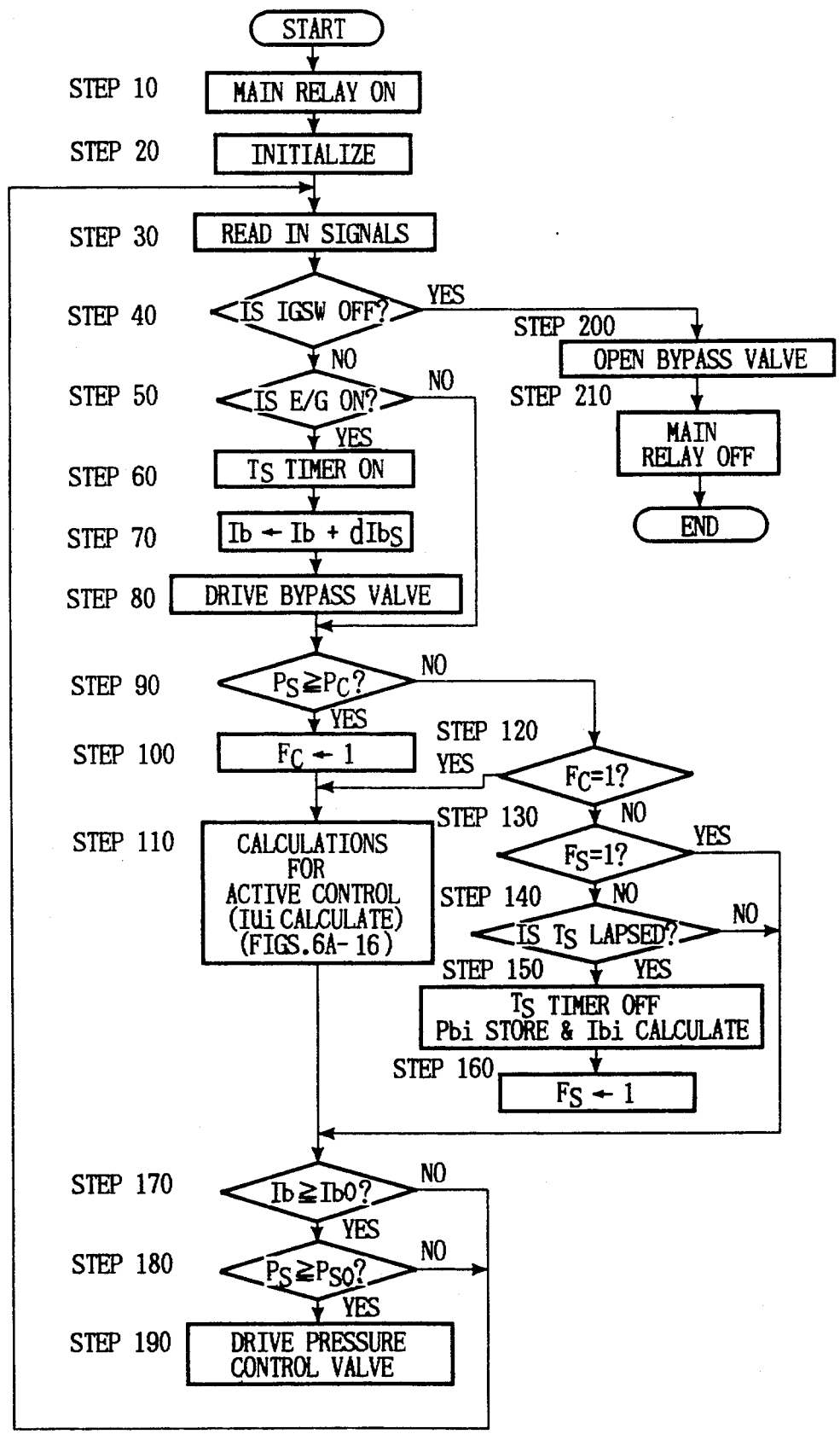
FIG. 3 is a flowchart showing a flow of control carried out by the electric control device shown in FIG. 2.

In this connection, it is to be noted that the routine of the control flow shown in FIG. 3 is initiated when the ignition switch 216 is turned on. It should also be noted that in the flowchart shown in FIG. 3, a flag Fc relates to whether or not the pressure Ps of the oil within the high pressure line has ever exceeded a threshold pressure Pc above which the cut-off valves 152, 150, 156 and 154 are completely opened and that Fc=1 means that the pressure Ps has ever exceeded the pressure Pc, and a flag Fs relates to whether or not standby pressures Pbi (i=1, 2, 3 and 4) referred to later have been set for the pressure control valves 34, 32, 38 and 36, and that Fs=1 means that the standby pressure have been set.

In the first step 10, a main relay not shown in the figures is turned on, and then the flow of control proceeds to step 20.

In step 20, the RAM 208 is cleared off of all the information stored therein and all the flags are reset to zero, and then the flow of control proceeds to step 30.

In step 30, data are read in with respect to the signal indicative of the rotational speed N of the engine 14 detected by the rotational speed sensor 16, the signal indicative of the temperature T of oil detected by the temperature sensor 195, signals indicative of the pressures Ps and Pd in the high pressure and the low pressure line detected by the pressure sensors 197 and 198, respectively, the signals indicative of the pressures Pi in the working fluid chambers 2FL, 2FR, 2RL and 2RR detected by the pressure sensors 199FL, 199FR, 199RL and 199RR, the signal indicative of whether or not the ignition switch 216 is on, the signals indicative of the vehicle heights Xi detected by the vehicle heights sensors 144FL, 144FR, 144RL and 144RR, the signal indicative of the vehicle speed V detected by the speed sensor 234, the signals indicative of the longitudinal acceleration Ga detected by the longitudinal acceleration sensor 236, the signal indicative of the lateral acceleration Gl detected by the lateral acceleration sensor 237, the signal indicative of the steering angle As detected by the steering angle sensor 240, and the signal indicative of whether the mode of controlling the vehicle height set by the vehicle height setting switch 248 is the high mode or the normal mode, and then the flow of control proceeds to step 40.

In step 40, it is judged if the ignition switch is off. If it is judged that the ignition switch is of, the flow of control proceeds to step 200, whereas if it is judged that the ignition switch is on, the flow of control proceeds to step 50.

In step 50, it is judged if the engine is running based upon whether or not the rotational speed N of the engine detected by the rotational speed sensor 16 and read in in step 30 is higher than a predetermined value. If it is judged that the engine is not running, the flow of control proceeds to step 90, whereas it if is judged that the engine is running, the flow of control proceeds to step 60.

It is to be understood that the judgement with regard to whether or not the engine is running may be made based upon by other parameters such as, for example, whether or not the voltage of the electricity generated by an alternator, not shown, driven by the engine is higher than a predetermined value.

In step 60, a timer is started to count the period of time Ts from the time point at which the engine is started to the time point at which the standby pressures Pbi are set for the pressure control means 34, 32, 38 and 36 in step 150 referred to later, and then the flow of control proceeds to step 70. If, however, the timer has already been started, it continues time counting.

Figure 4:
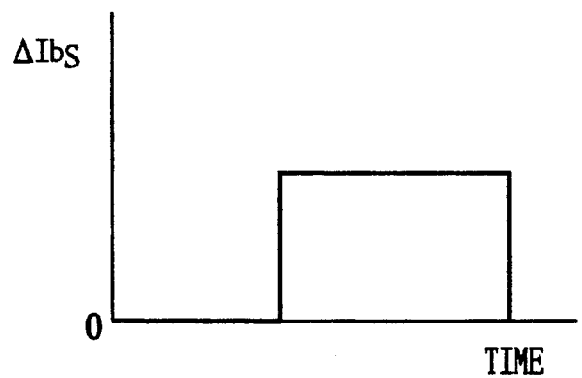
FIG. 4 is a graph showing a map used in calculating the electric current Ib to be supplied to the bypass control means when the active suspension system is being started.
Figure 5:
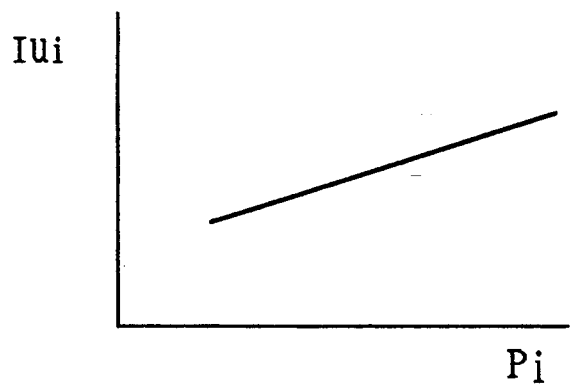
FIG. 5 is a graph showing a relation between the pressures Pi in the working fluid chambers of the actuators and the electric currents Ibi supplied to the pressure control means.
Figure 6A:
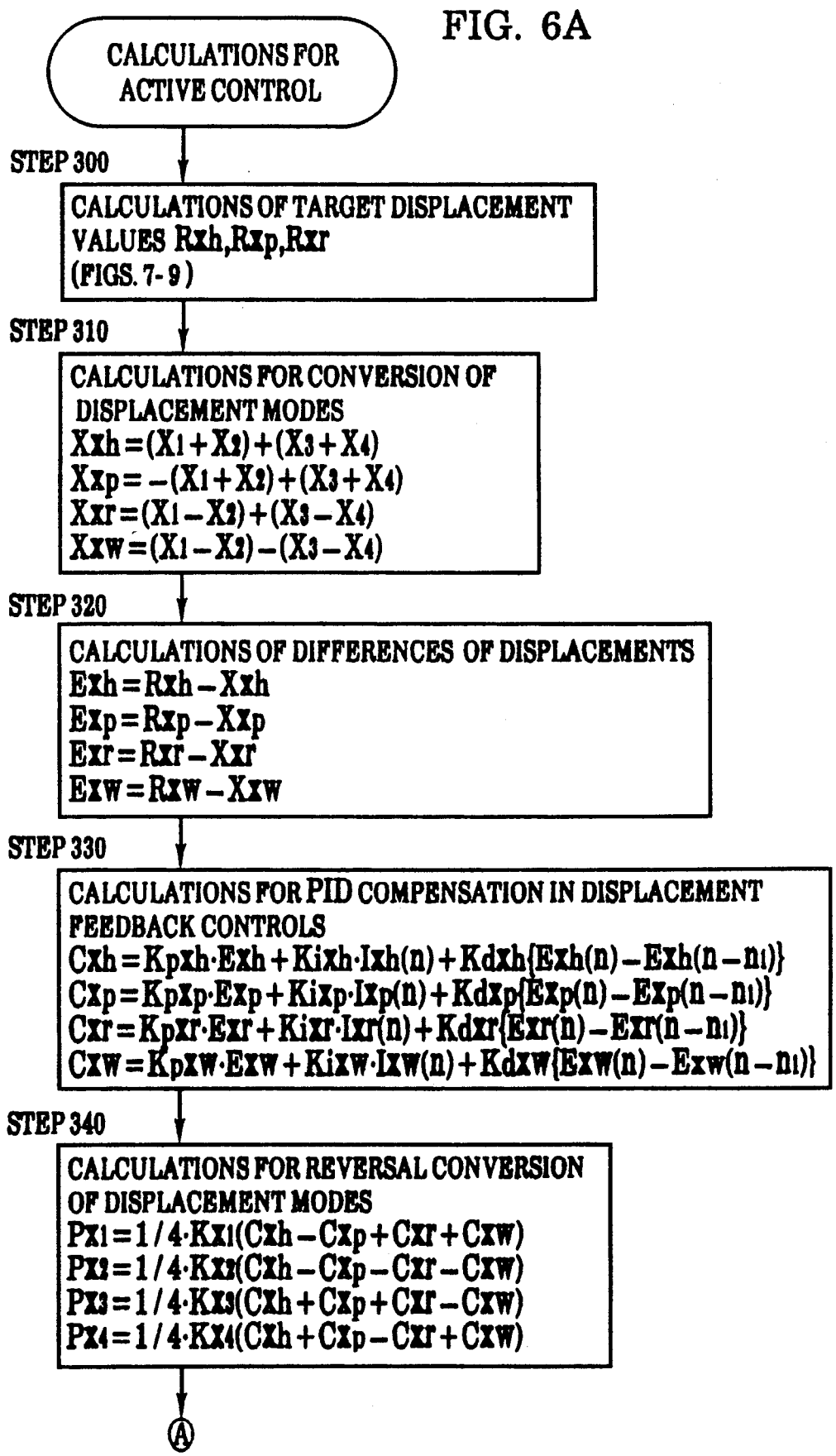
Figure 6B:
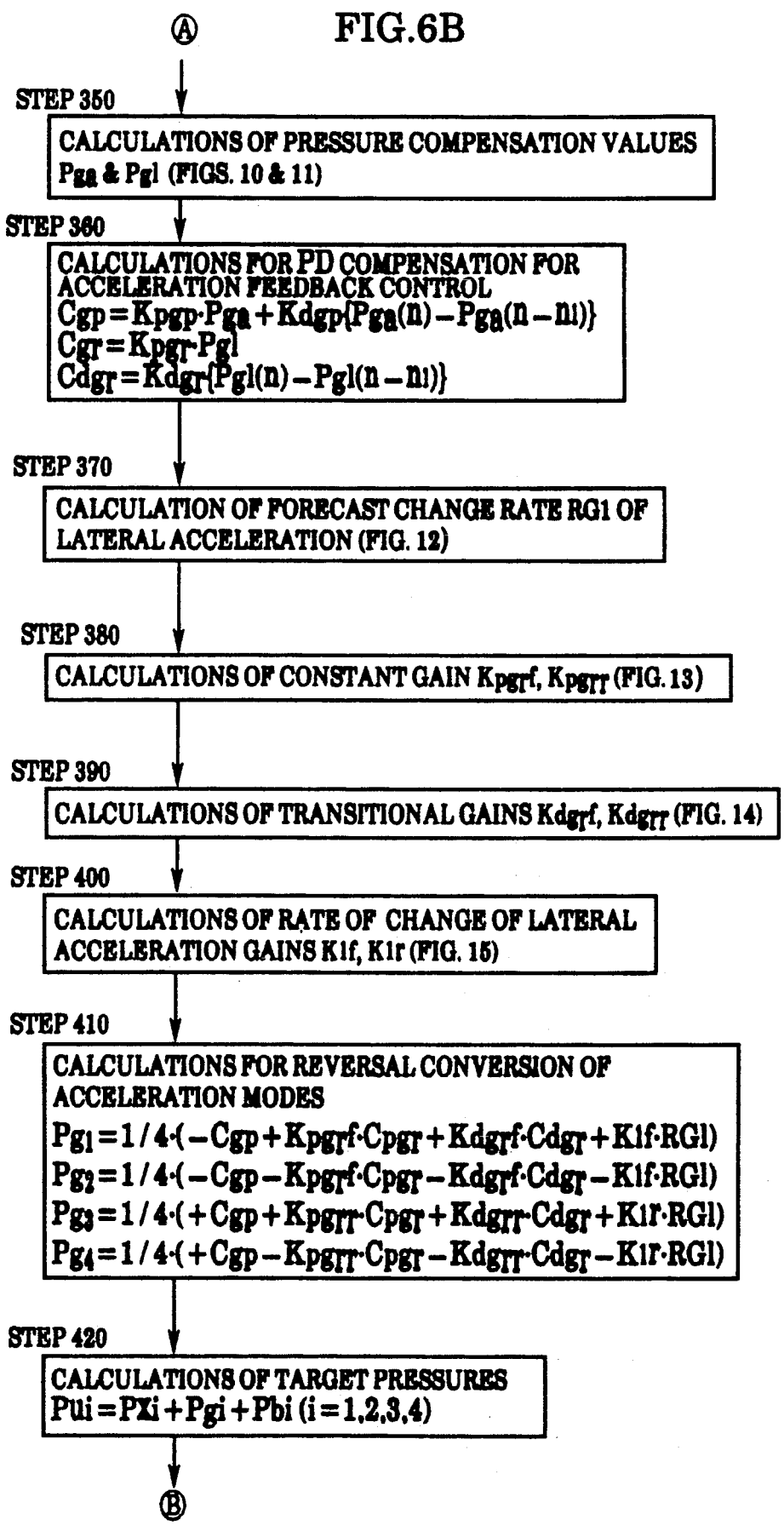

In step 70, an electric current Ib to be supplied to the solenoid 190 in the electromagnetic on-off valve 186 in the bypass control means 196 is calculated according to a map such as the graph shown in FIG. 4 and the following equation and is stored in ROM 206:

$$Ib = Ib + dIbs$$

Then the flow of control proceeds to step 80. In step 80, the electric current Ib calculated in the step 70 is supplied to the solenoid 190 in the electromagnetic on-off valve 186 so as thereby to shift the bypass control means 196 to its fully closed condition, and then the flow of control proceeds to step 90.

In step 90, it is judged whether or not the pressure Ps in the high pressure line is equal to or higher than the threshold value Pc. If it is judged that Ps is not equal to or not higher than Pc, the flow of control proceeds to step 120, whereas if it is judged that Ps is equal to or higher than Pc, the flow of control proceeds to step 100.

In step 100, the flag Fc is set to "1", and then the flow of control proceeds to step 110.

In step 110, as will be described in detail later with reference to FIGS. 6A through 6C and FIGS. 7 through 25, in order to control the comfortability of the vehicle and the attitude of the vehicle body, calculations for the active control are carried out based upon the data read in in step 30 so as to calculate the electric currents Iui to be supplied to the solenoids 78, 58, 82 and 80 incorporated in the variable throttle means 72, 54, 76 and 74 in the pressure control means, and then the flow of control proceeds to step 170.

In step 120, it is judged whether or not the flag Fc is "1". If it is judged that the flag Fc is "1", i.e., the pressure Ps of the oil in the high pressure line has lowered to a level lower than the threshold pressure Pc after it had once been increased to a level equal to or higher than the threshold value, the flow of control proceeds to step 110, whereas it if it judged that the flag Fc is not "1", i.e., the pressure ps has not yet been increased to a level equal to or higher than the threshold pressure Pc, then the flow of control proceeds to step 130.

In step 130, it is judged whether or not the flag Fs is "1". If it is judged that the flag Fs is "1", the flow of control proceeds to step 170, whereas if it is judged that the flag Fs is not "1", the flow of control proceeds to step 140.

In step 140, it is judged whether or not the time Ts has elapsed. If it is judged that the time Ts has not yet elapsed, the flow of control proceeds to step 170, whereas if it is judged that the time Ts has elapsed, the flow of control proceeds to step 150.

In step 150, the Ts timer is stopped, and the pressures Pi read in in step 30 are stored in the RAM 208 as the standby pressures Pbi, and further the values of the electric currents Ii (i=1, 2, 3 and 4) to be supplied to the solenoids 78, 58, 82 and 80 incorporated in the variable throttle means 72, 54, 76 and 74 in the pressure control means 34, 38 and 36 are calculated based upon the map as shown in FIG. 4 stored in the ROM 206 so that the pressures in the connection lines 84, 56, 88 and 86 between the associated pressure control means and the associated cut-off valves are controlled to the respective standby pressures Pbi, i.e., the pressures which are substantially equal to the pressures Pi in the working fluid chambers 2FL, 2FR, 2RL and 2RR that are detected by the associated pressure sensors, and then the flow of control proceeds to step 160.

In step 160, the flag Fs is set to "1", and then the flow of control proceeds to step 170.

In step 170, it is judged whether or not the electric current Ib calculated in step 70 is not less than a reference value Ibo. If it is judged that the current Ib is less than Ibo, the flow of control is returned to step 30, whereas if it is judged that the current Ib is not less than Ibo, the flow of control proceeds to step 180.

In step 180, it is judged whether or not the pressure Ps in the high pressure line read in in step 30 is not less than a reference value Pso which is lower than the threshold value Pc. If it is judged that Ps is less than Pso, then the flow of control is returned to step 30, whereas if it is judged that Ps is not less than Pso, the flow of control proceeds to step 190.

In step 190, the electric currents Ibi calculated in step 150 or the electric currents Iui calculated in step 110 are supplied to the solenoids 78, 58, 82 and 80 incorporated in the variable throttle means included in the associated pressure control means so that they are operated to adjust the pressures in the working fluid chambers in the associated actuators, and then the flow of control is returned to step 30. Thus, the steps 30 through 190 are repeated.

In step 200, the supply of the electric current to the solenoid 190 in the electromagnetic on-off valve 186 is stopped to open the bypass control means 196, and then the flow of control proceeds to step 210.

In step 210, the main relay is turned off to finish the control flow shown in FIG. 3, and the supply of electricity to the electric control device 200 shown in FIG. 2 is stopped.

It is to be noted that the pressure control conducted by the bypass control means when the system is started forms no essential part of the present invention. For more details in this regard, if desired, reference should be made to Japanese Patent Application 63-307189 assigned to the assignee as the present application. It is also to be understood that the pressure control conducted by the bypass control means for stopping the system may be carried out in the same manner as in the system described in Japanese Patent Application 63-307190 assigned to the same assignee as the present application.

Referring next to the FIGS. 6A through 6C and FIGS. 7 through 16, calculations for the active control conducted in the above-mentioned step 110 will be described.

Figure 7:
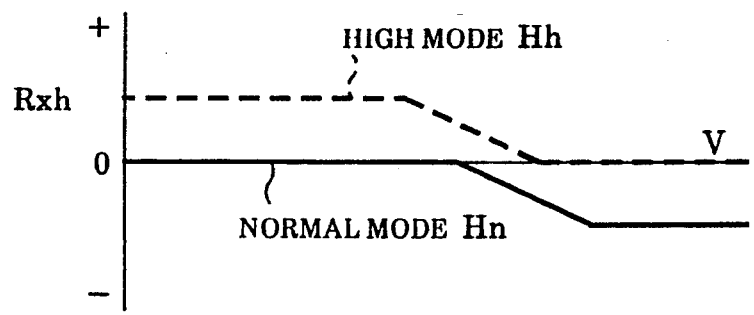
FIG. 7 is a graph showing a relation between a vehicle speed V and a target displacement Rxh.
Figure 8:
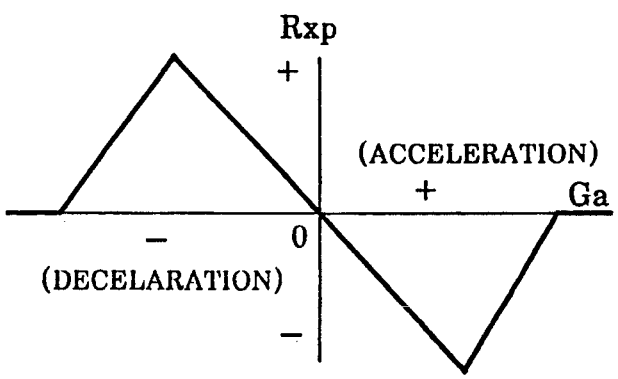
FIG. 8 is a graph showing a relation between a longitudinal acceleration Ga and a target displacement Rxp.
Figure 9:
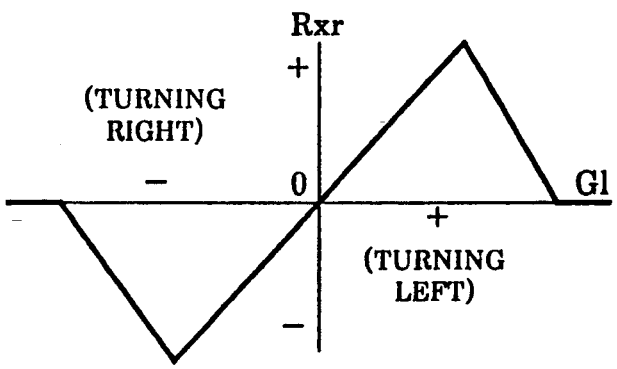
FIG. 9 is a graph showing a relation between a lateral acceleration Gl and a target displacement Rxr.

In step 300, based upon maps such as the graphs shown in FIGS. 7 through 9, target values Rxh, Rxp and Rxr for the heave, pitch and roll, respectively, required for attaining a desired attitude of the vehicle body are calculated, and then the flow of control proceeds to step 310.

It is to be noted that in FIG. 7, the solid line shows a normal mode pattern which is set up when the vehicle height setting switch is set to a normal mode and the dotted line shows a high mode pattern which is set up when the vehicle height setting switch is set to a high mode.

In step 310, based upon the vehicle heights X1, X2, X3 and X4 at the front left, front right, rear left, and rear right wheels read in in step 30, calculations for converting the displacements into values of heave "Xxh"m, pitch "Xxp", roll "Xxr" and "Xxw" are carried out according to the following equations, and thereafter the flow of control proceeds to step 320:

$$Xxh = (X1 + X2) + (X3 + X4)$$

$$Xxp = (X1 + X2) + (X3 + X4)$$

$$Xxr = (X1 - X2) + (X3 - X4)$$

$$Xxw = (X1 - X2) + (X3 - X4)$$

In step 320, differences in the respective mode values are calculated according to the following equations, and then the flow of control proceeds to step 330:

$$Exh = Rxh - Xxh$$

$$Exp = Rxp - Xxp$$

$$Exr = Rxr - Xxr$$

$$Exw = Rxw - Xxw$$

In this connection, Rxw may be zero, or a value of Xxw calculated in step 410 just after the active suspension system has been started up to operate or an average value of Xxw calculated in the last few cycles. If the absolute value of Exw is equal to or less than W1 (a certain positive constant), Exw is set to zero.

In step 330, calculation for PID compensations in a displacement feedback control are conducted according to the following equations, and thereafter the flow of control proceeds to step 340.

$$Cxh = Kpxh \cdot Exh + Kixh \cdot Ixh(n) + Kdxh \cdot \{Exh(n) - Exh(n-n1)\}$$

$$Cxp = Kpxp \cdot Exp + Kixp \cdot Ixp(n) + Kdxp \cdot \{Exp(n) - Exp(n-n1)\}$$

$$Cxr = Kpxr \cdot Exr \cdot Kixr \cdot Ixr(n) + Kdxr \cdot \{Exr(n) - Exr(n-n1)\}$$

$$Cxw = Kpxw \cdot Exw + Kixw \cdot Ixw(n) + Kdxw \cdot \{Exw(n) - Exw(n-n1)\}$$

In the above equations, Ej(n) (j=xh, xp, xr, xw) are the current values of Ej, and Ej(n−nl) are the values of Ej at the cycle preceding to the current cycle as much as n1 cycles. Further, denoting Ij(n) and Ij(n−1) to be the current value of Ij and the value of Ij at the one cycle preceding cycle, and Tx to be a time constant, respectively.

$$Ij(n) = Ej(n) + Tx \, Ij(n-1)$$

and assuming Ijmax to be a predetermined value, the absolute value of Ij is equal to or smaller than Ijmax. The coefficients Kpj, Kij and Kdj (j=xh, xp, xr and xw) are proportional constants, integration constants and differentiation constants, respectively.

In step 340, calculations for reversal conversion of the displacement modes are carried out according to the following equations, and then the flow of control proceeds crosses to step 350:

$$Px1 = \tfrac{1}{4} \cdot Kx1(Cxh - Cxp + Cxr + Cxw)$$

$$Px2 = \tfrac{1}{4} \cdot Kx2(Cxh - Cxp - Cxr - Cxw)$$

$$Px3 = \tfrac{1}{4} \cdot Kx3(Cxh + Cxp + Cxr - Cxw)$$

$$Px4 = \tfrac{1}{4} \cdot Kx4(Cxh + Cxp - Cxr + Cxw)$$

wherein Kx1, Kx2, Kx3 and Kx4 are proportional constants.

Figure 10:
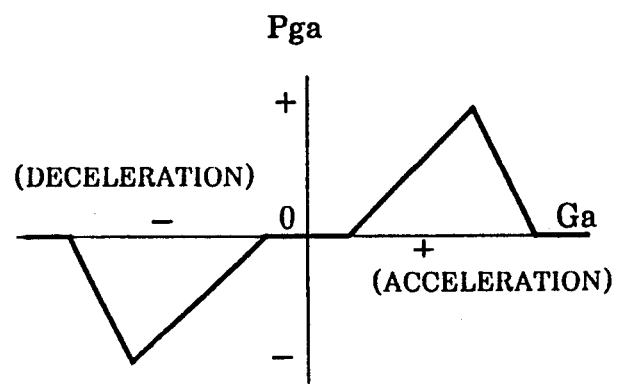
FIGS. 10 is a graph showing a relation between a longitudinal acceleration Gl and the compensation amount Pgl for the pressure.
Figure 11:
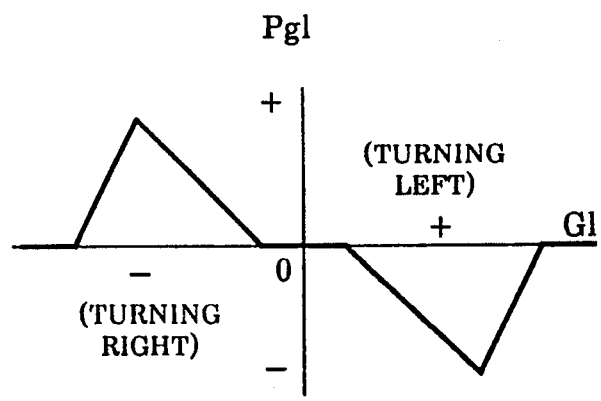
FIG. 11 is a graph showing a relation between the lateral acceleration Gl and the compensation amount Pgl for the pressure.

In step 350, based upon maps such as the graphs shown in FIGS. 10 and 11, pressure compensations Pga and Pgl in the longitudinal and lateral directions, respectively, are calculated, and then the flow of control proceeds to step 360:

In step 360, calculations for PD compensations for acceleration feedback control are carried out with respect to pitch (Cgp) and roll (Cgr, Cdgr) according to the following equations, and thereafter the flow of control proceeds to step 370:

$$Cgp = Kpgp \cdot Pga + Kdgp\{Pga(n) - Pga(n-n1)\}$$

$$Cpgr = Kpgr \cdot Pgl$$

$$Cdgr = Kdgr \cdot \{Pgl(n) - Pgl(n-n1)\}$$

Here Pga(n) and Pgl(n) are present Pga and Pgl, respectively, and Pga(n−n1) and Pgl(n−n1) are Pga and Pgl at the cycle which is preceding by n1 cycles to the present cycle. Kdgp and Kdgr are proportional constants, while Kdgp and Kdgr are differentiation constants.

In step 370, denoting the steering angle read in in step 30 at the one cycle preceding cycle in the flowchart of FIG. 3 as As', steering angle velocity RAs is calculated according to the following equation:

$$RAs = As - As'$$

Figure 12:
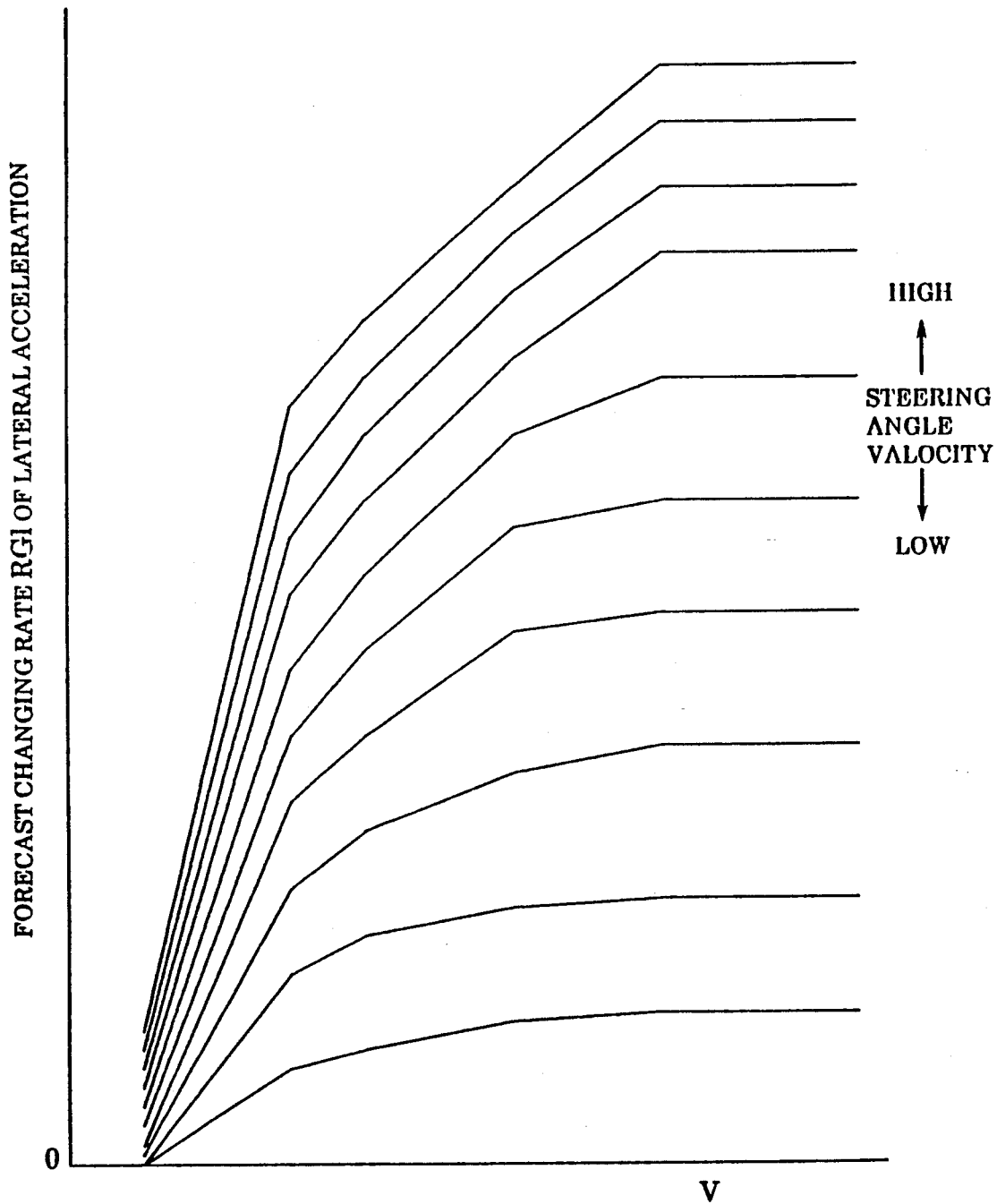
FIG. 12 is a graph showing the relation among vehicle speed V, steering angle velocity As and the rate of change of forecast lateral acceleration RGl.

Then based upon a map such as the graph shown in FIG. 12, the steering angle velocity RAs calculated above, and vehicle speed V, a forecast change rate Rgl of the lateral acceleration Gl is calculated, and thereafter the flow of control proceeds to step 380.

In step 380, constant gains Kpgrf and Kpgrr for use in the calculations in a later step 410 are calculated based upon a map corresponding to the graph shown in FIG. 13, and then the flow of control proceeds to step 390.

Figure 13:
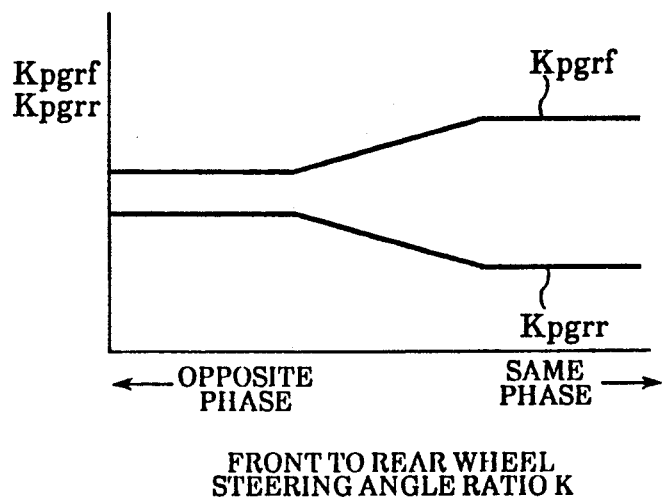
FIG. 13 is a graph showing the relation between the constant gains Kpgrf, Kpgrr and the front to rear wheel steering angle ratio K.

In the embodiment shown in FIG. 13, Kpgrf is substantially constant when the front to rear wheel steering angle ratio K is in the opposite phase region, then gradually increases as the front to rear wheel steering angle ratio K changes from the opposite phase to the same phase, and then remains to be substantially constant when the front to rear wheel steering ratio K further increases. On the other hand, Kpgrr is substantially constant at a value lower than Kpgrf when the front to rear wheel steering angle ratio K is in the opposite phase region, then gradually decreases as the front to rear wheel steering angle ratio K changes from the opposite phase to the same phase, and then remains to be substantially constant when the front to rear wheel steering ratio further increases.

In step 390, gains Kdgrf and Kdgrr for use in the calculations in said later step 410 are calculated based upon a map corresponding to FIG. 14, and then the flow of control proceeds to step 400.

Figure 14:
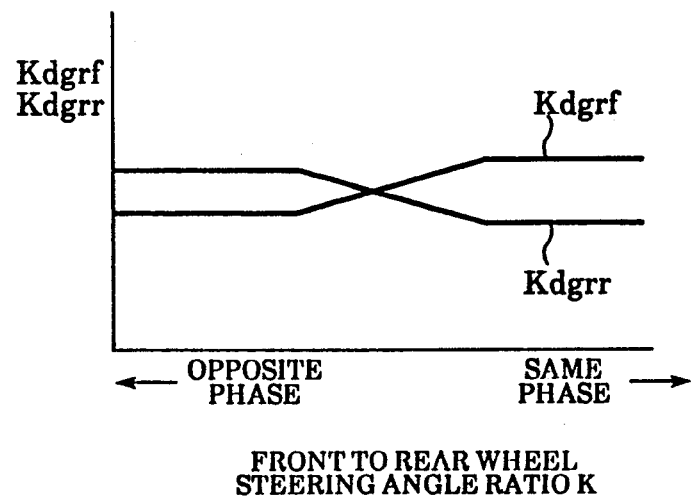
FIG. 14 is a graph showing the relation between the transitional gains Kdgrf, Kdgrr and the front to rear wheel steering angle ratio K.

In the embodiment shown in FIG. 14, Kdgrf is substantially constant when the front to rear wheel steering angle ratio K is in the opposite phase region, then gradually increases as the front to rear wheel steering angle ratio K changes from the opposite phase to the same phase, and then remains to be substantially constant when the front to rear wheel steering ratio K further increases. On the other hand, Kdgrr is substantially constant at a value higher than Kdgrf when the front to rear wheel steering angle ratio K is in the opposite phase region, then gradually decreases to be less than Kdgrf as the front to rear wheel steering angle ratio K changes from the opposite phase to the same phase, and then remains to be substantially constant when the front to rear wheel steering ratio further increases.

In step 400, gains Klf and Klr for use in the calculations in said later step 410 are calculated based upon a map corresponding to FIG. 15, and then the flow of control proceeds to step 410.

Figure 15:
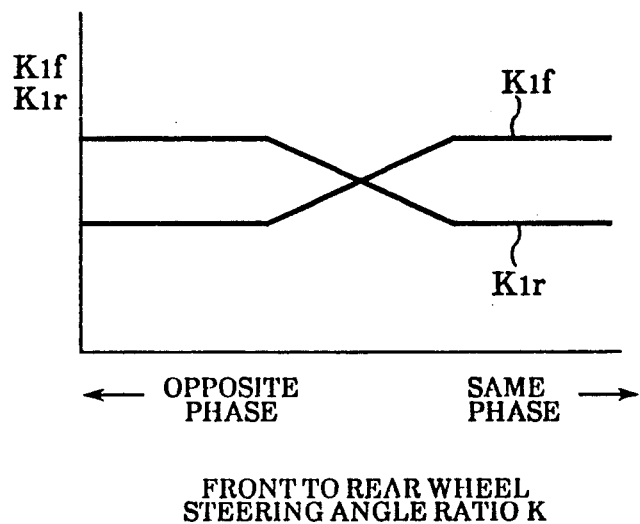
FIG. 15 is a graph showing relation between the gains Klf, Klr for the rate of change of forecast lateral acceleration and the front to rear wheel steering angle ratio K.

In the embodiment shown in FIG. 15, Klf is substantially constant when the front to rear wheel steering angle ratio K is in the opposite phase region, then gradually increases as the front to rear wheel steering angle ratio K changes from the opposite phase to the same phase, and then remains to be substantially constant when the front to rear wheel steering ratio K further increases. On the other hand, Klr is substantially constant at a value higher than Klf when the front to rear wheel steering angle ratio K is in the opposite phase region, the gradually decreases to be less than Klf as the front to rear wheel steering angle ratio K changes from the opposite phase to the same phase, and then remains to be substantially constant when the front to rear wheel steering ratio further increases.

In step 410, calculations for reversal conversion of the acceleration modes are carried out according to the following equations, and then the flow of control proceeds to step 420:

$$Pg1 = \tfrac{1}{4} \cdot (-Cgp + Kpgrf \cdot Cpgr + Kdgrf \cdot Cdgr + Klf \cdot RGl)$$

$$Pg2 = \tfrac{1}{4} \cdot (-Cgp - Kpgrf \cdot Cpgr - Kdgrf \cdot Cdgr - Klf \cdot RGl)$$

$$Pg3 = \tfrac{1}{4} \cdot (Cgp + Kpgrf \cdot Cpgr + Kdgrr \cdot Cdgr + Klf \cdot RGl)$$

$$Pg4 = \tfrac{1}{4} \cdot (Cgp - Kpgrf \cdot Cpgr - Kdgrr \cdot Cdgr - Klf \cdot RGl)$$

In step 420, based upon the pressures Pbi stored in the RAM 208 in step 150 and the results of calculations in steps 340 and 410, target pressures Pui for the pressure control means are calculated according to the following equation, and thereafter the flow of control proceeds to step 430:

$$Pui = Pxi + Pgi + Pbi \quad (i = 1, 2, 3 \text{ and } 4)$$

In the step 430, target electric currents to be supplied to the pressure control means are calculated according to the following equations, and then the flow of control proceeds to step 440:

$$I1 = Ku1 \cdot Pu1 + Kh(Psr - Ps) - Kl \cdot Pd - a$$

$$I2 = Ku2 \cdot Pu2 + Kh(Psr - Ps) - Kl \cdot Pd - a$$

$$I3 = Ku3 \cdot Pu3 + Kh(Psr - Ps) - Kl \cdot Pd$$

$$I4 = Ku4 \cdot Pu4 + Kh(Psr - Ps) - Kl \cdot Pd$$

It is to be noted that Ku1, Ku2, Ku3, Ku4 are proportional constants for the corresponding vehicle wheels; Kh and Kl are compensation coefficients for the pressures in the high pressure and the low pressure lines, respectively; a is a compensation constant between the front and rear vehicle wheels; and Psr is a standard pressure in the high pressure line.

Figure 16:
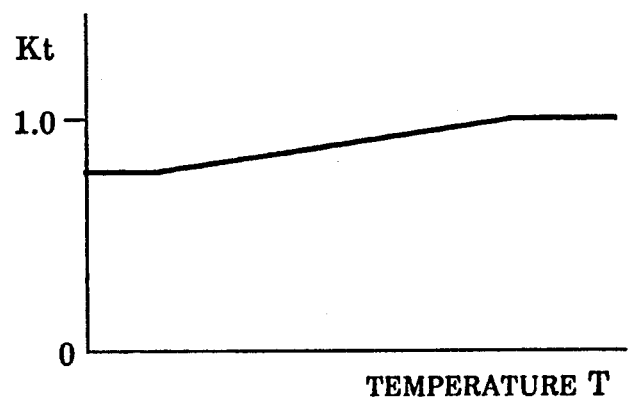
FIG. 16 is a graph showing the relation between the compensation coefficient Kt and the temperature T of the working fluid.

In step 440, based upon the temperature T of oil read in in step 30 and the map of the graph shown in FIG. 16, a compensation coefficient Kt for the oil temperature is calculated, and the calculations for compensating the target electric currents with respect to the oil temperature are carried out according to the following equation, and then the flow of control proceeds to step 450:

$$Iti = Kt \cdot Ii \quad (i = 1, 2, 3 \text{ and } 4)$$

In step 450, an electric current for a warping, i.e., a twisting of the vehicle body about the longitudinal axis thereof, is calculated according to the following equation, and thereafter the flow of control proceeds to step 460:

$$Iw = (It1 - It2) - (It3 - It4)$$

In step 460, denoting the target electric current value for warping as Riw, a difference of the electric current for warping from the target value therefore is calculated according to the following equation, and then the flow of control proceeds to step 470:

$$Eiw = Riw - Iw$$

In the above equation the target electric current value for warping Riw may be zero.

In step 470, employing a proportional constant Kiwp a target control value of the electric current for warping is calculated according to the following equation, and then the flow of control proceeds to step 480:

$$Eiwp = Kiwp \cdot Eiw$$

In step 480, calculations for reversal conversion of the electric current for warping are carried out according to the following equations, and thereafter the flow of control proceeds to step 490:

$$Iw1 = Eiwp/4$$

$$Iw2 - = Eiwp/4$$

$$Iw3 - = Eiwp/4$$

$$Iw4 = Eiwp/4$$

In step 490, based upon the values obtained by the calculations conducted in steps 440 and 480, final target electric currents Iui to be supplied to the pressure control means are calculated according to the following equation, and then the flow of control proceeds to the step 170 shown in FIG. 3.

$$Iui = Iti + Iwi \quad (i = 1, 2, 3 \text{ and } 4)$$

Thus, in the shown embodiment, both in the normal and the sports mode operation of the four wheel steering means the front to rear wheel steering angle ratio K is set to be higher in the opposite phase direction as the vehicle speed is lower and to be higher in the same phase direction as the vehicle speed is higher. Further, in step 360, the transitional gain Kdgrf for the rate of change of lateral acceleration (corresponding to Cdgr) in the front wheels is set to be higher while the transitional gain Kdgrr for the rate of change of lateral acceleration in the rear wheels is set to be lower as the front to rear wheel steering angle ratio K increases in the same phase direction, and therefore, as the vehicle speed increases, so that the ratio of compensation for the load to be born by the front wheels to that to be born by the rear wheels is increases as the vehicle speed increases. Therefore, according to the shown embodiment, the US-OS performance is more shifted to the understeer side as the vehicle speed increases. Thus, the stability in steering at high vehicle speed is improved while preserving the quick steering performance at low vehicle speed.

Further, according to the shown embodiment, just in the same manner as in the rate of change of lateral acceleration, the gain Klf for the rate of change of the forecast lateral acceleration Rgl for the front wheels calculated in the step 370 is also set to be greater while the gain Klr for the rate of change of the forecast lateral acceleration Rgl for the rear wheels is set to be smaller as the front to rear wheel steering ratio increases in the same phase direction, i.e. as the vehicle speed increases, so that the compensation for the load to be born based upon the forecast lateral acceleration is also increased for the front wheels relative to the rear wheels as the vehicle speed increases. This arrangement also contributes to improving the stability in steering at high vehicle speed while preserving the quick steering performance at low vehicle speed.

Further, in the shown embodiment, in addition to the modifications of the gains for the rate of change of the lateral acceleration and the rate of change of the forecast lateral acceleration, the constant gains Kpgrf and Kpgrr for the lateral acceleration are also controlled according to the front to rear wheel steering ratio K so that the gain Kpgrf for the front wheels is increased while the gain Kpgrr for the rear wheels is decreases as the front to rear wheel steering ratio K increases in the same phase direction.

Further, in the shown embodiment, both the constant gains Kpgrf, Kpgrr and the transitional gains Kdgrf, Kdgrr are controlled according to the front to rear wheel steering angle ratio, so that the front wheel gains Kpgrf and Kdgrf are increased along with increase of the front to rear wheel steering angle ratio in the direction of the same phase while the rear wheel gains Kpgrr and Kdgrr are decreased along with increase of the front to rear wheel steering angle ratio, in steps 380 and 390, respectively, with such conditions as:

Kpgrf is greater than Kdgrf
Kpgrr is greater than Kdgrr

Therefore, the relation between the front to rear wheel steering ratio K and the stiffness to rolling available by the load distribution between the front and the rear wheels by the active suspension, i.e. the US-OS performance, is as flows:

| | US-OS Performance | |
| --- | --- | --- |
| K | Transitional state in turning | Constant state in turning |
| Same phase | low understeer (highly stiff to rolling in rear) | medium understeer (stiff in medium to rolling in front) |
| Opposite phase | medium understeer (stiff in medium to rolling in front) | high understeer (highly stiff to rolling in front) |

As will be understood in the above table, in the same phase region corresponding to high vehicle speed, the degree of understeer characteristic of the US-OS performance is decreased in the transitional state in a turning as compared in the constant state in the turning, and therefore, the responsiveness to steering in the transitional state at high vehicle speed is improved without sacrificing the stability in steering at high vehicle speed.

In both transitional and constant states in a turning, at low vehicle speed in which the phase is in the opposite the US-OS performance is shifted on the side of oversteer so that the quick steering is preserved, while at high vehicle speed in which the phase is in the same the US-OS performance is shifted on the side of understeer so that the stability in steering is improved. If the shifting on the side of understeer of the US-OS performance at low vehicle speed opposite phase region in the transitional state in a turning is low, the stability in steering just after the completion of turning the steering wheel is liable to lessened. In this connection, since in the shown embodiment the Us-OS performance in the constant state in a turning in the opposite phase region is more shifted on the side of understeer than in the transitional region, such a deterioration of stability in steering just after the completion of turning of the steering wheel is avoided. Further, since in the same phase region the US-OS performance is more shifted on the side of understeer in the constant state in a turning than in the transitional state in a turning, the stability in steering at high vehicle speed is ensured without sacrificing the steering performance at high vehicle speed.

Further, in the shown embodiment, in the same manner as in the rate of change of the lateral acceleration, the gains Klf and Klr for the rate of change of the forecast lateral acceleration RGl calculated in step 370 are modified so that Klf for the front wheels is increased, while Klr for the rear wheels is decreased, along with increase of the front to rear wheel steering angle ratio in the direction of the same phase, i.e. along with increase of vehicle speed, and thereby the load to be born by each wheel due to the rate of change of the forecast lateral acceleration is modified so that the amount of modification is greater for the rear wheels along with increase of vehicle speed. This arrangement contributes to improving the stability in steering at high vehicle speed without sacrificing the quick steering performance at low vehicle speed.

Further, since the various gains are controlled according to the front to rear wheel steering ratio K in the shown embodiment, the US-OS performance can be more desirably matched to the four wheel steering means as compared to the art that various gains are controlled according to vehicle speed, so that, when the four wheel steering means is switched over between the normal mode and the sports mode, the overall steering stability of the vehicle can be more improved.

Although the various gains are calculated from maps including the front to rear wheel steering ratio K as a parameter in the shown embodiment, those gains may be calculated from a map using vehicle speed as a parameter. Further, although the control means 200 is supplied with a signal indicative of the front to rear wheel steering ratio K from the four wheel steering means 242, the control means 200 may be constructed to store a map corresponding to the graph shown in FIG. 17, and is supplied with a signal indicative only of the discrimination between the normal mode and the sports mode, so as to calculate therein the front to rear wheel steering ratio based upon such a signal and vehicle speed.

As is apparent from the foregoing descriptions, according to the present invention the working fluid supply and exhaust means is controlled based upon a control amount according to the rate of change of lateral acceleration of the vehicle body so as to modify the load to be born by each wheel and thereby to suppress the rolling of the vehicle body, and in such a control the rate of modification for the front wheels to that for the rear wheels is increases along the increase of vehicle speed, or the said of modification is decreased along with decrease of vehicle speed. Thus, the US-OS performance is shifted on the side of understeer at high vehicle speed without changing the US-OS performance at low vehicle speed, so that the stability in steering at high vehicle speed is improved without sacrificing the quick steering performance at low vehicle speed.

Further, as is apparent from the foregoing description, according to the present invention, the roll stiffness in the rear wheels is decreased along with increase of the front to rear wheel steering angle ratio, and the roll stiffness in the rear wheels is increased in the transitional state in a turning as compared in the constant state in the turning.

Therefore, the US-OS performance can be set to an understeer condition at high vehicle speed without increasing the steering angle in the rear wheels, so that it is avoided that an early rolling occurs in the vehicle body. Further, the degree of understeering characteristic of the US-OS performance at high vehicle speed is decreased in the transitional state in a turning as compared in the constant state in the turning, and therefore the responsiveness to steering in the transitional state in a turning is improved. Further, the US-OS performance in the constant state in a turning at high vehicle speed is maintained at a determinate understeer characteristic, and therefore an improved stability in steering is ensured in the constant state in a turning at high vehicle speed.

Although the invention has been described with respect to some particular embodiments thereof, it will be apparent to those ordinary skill in the art that various modifications are possible within the scope of the present invention.

I claim:

1. A vehicle suspension system for a vehicle such as an automobile, comprising a plurality of fluid pressure type actuators provided between a vehicle body and each wheel, a working fluid supply and exhaust means for supplying and exhausting working fluid to and from said actuators, a means for detecting or forecasting a rate of change of lateral acceleration of the vehicle body, a control means for controlling said working fluid supply and exhaust means according to a control amount depending upon said rate of change of lateral acceleration of the vehicle body so as to adjust a supporting load at each wheel and thereby to suppress rolling of the vehicle body, wherein said control means increases a ratio of such adjustment for a front wheel to that for a rear wheel along with increase of vehicle speed.

2. A vehicle suspension system according to claim 1, wherein said control mans controls said working fluid supply and exhaust means so as to shift a steering performance of the suspension toward an understeering performance along with increase of vehicle speed.

3. A vehicle suspension system according to claim 1, wherein a front to rear wheel steering angle ratio is changed from an opposite phase to a same phase along with increase of vehicle speed, and said increase in said adjustment in said ratio for the front wheel to that for the rear wheel along with increase of vehicle speed is calculated based upon said front to rear wheel steering angle ratio.

4. A vehicle suspension system for a vehicle such as an automobile having a four wheel steering mans adapted to change a front to rear wheel steering angle ratio from an opposite phase to a same phase along with increase of vehicle speed, comprising a plurality of fluid pressure type actuators provided between a vehicle body and each wheel, a working fluid supply and exhaust means for supplying and exhausting working fluid to and from said actuators, a front wheel roll stiffness control means and a rear wheel roll stiffness control means adapted to control roll stiffness in front wheels and rear wheels, respectively, a means for obtaining said front to rear wheel steering angle ratio, a means for detecting a transitional state in a turning, and a means for controlling said front and rear roll stiffness control means, wherein said roll control means is adapted to decrease the roll stiffness in the rear wheels along with increase of the front to rear wheel steering angle ratio in a direction of the same phase, and to increase the roll stiffness in the rear wheels in the transitional state in the turning as compared in a constant state in the turning.

5. A vehicle suspension system according to claim 4, wherein said front wheel roll stiffness control means, said rear wheel roll stiffness control means, and said means for controlling said front and rear roll stiffness control means are provided by an active suspension.

* * * * *